Figure 1:
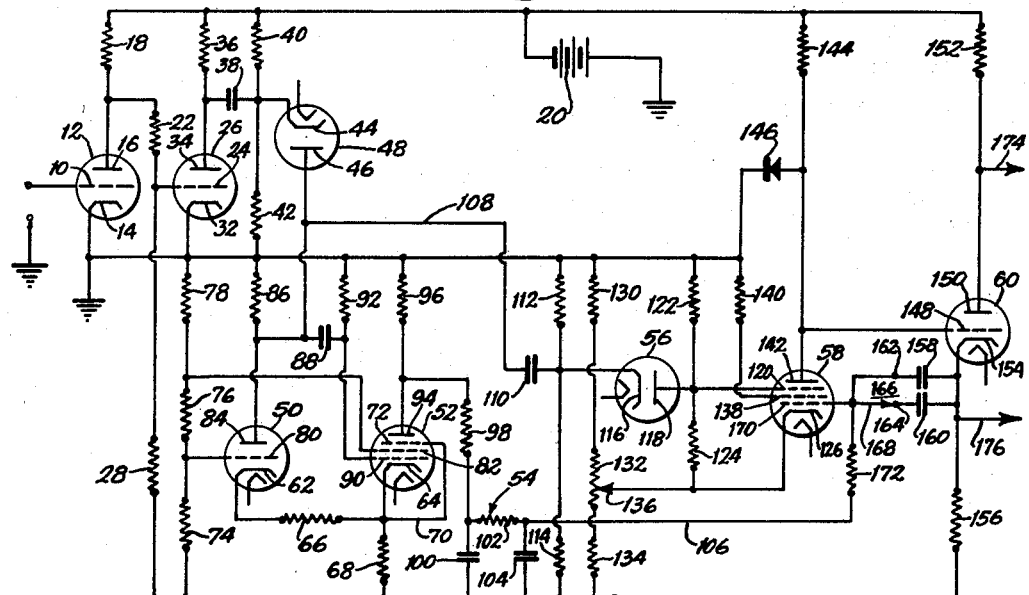

Aug. 9, 1960　　　　W. W. WELCOME　　　　2,948,857
SWEEP GENERATORS FOR CATHODE RAY OSCILLOGRAPHS
Filed Nov. 23, 1956

INVENTOR:
Warren W. Welcome,
BY Louis Sernal
ATTORNEY.

United States Patent Office 2,948,857
Patented Aug. 9, 1960

2,948,857

SWEEP GENERATORS FOR CATHODE RAY OSCILLOGRAPHS

Warren W. Welcome, Berkeley, Calif., assignor to Land-Air, Inc., Chicago, Ill., a corporation of Illinois Filed Nov. 23, 1956, Ser. No. 624,049

9 Claims. (Cl. 328—185)

This invention relates generally to improvements in sweep generators for cathode ray oscillographs and more particularly to improvements in sweep generators of the type adapted to provide a substantially constant amplitude sweep throughout a range of sweep repetition frequencies.

It is known to employ a cathode ray oscillograph for the measurement and observation of various transient phenomena. For example, it has been found advantageous to utilize a cathode ray oscillograph to provide visual indications in the testing and analysis of the operation of electrical circuits, such as the ignition circuits of internal combustion engines or the like. Conventionally, the sweep or time base of the oscillograph is synchronized with the cyclical operation of the circuit under observation to the end that the resultant traces of observable indications are held substantially stationary in position from time to time to enable the detection of defective or abnormal conditions in the operation of the engine.

Due to the relatively large variations in speed normally present during operation of an engine, conventional cathode ray oscillographs have not proved adaptable to the above described function. In such oscillographs the sweep is not maintained a constant length throughout the range of engine speed variations with the attendant result that the differences in sweep length between idling speed and high speed of the engine are sufficiently great to render the oscillograph unusable for this purpose.

As a consequence of this deficiency many prior art attempts have been made to furnish oscillographs in engine test equipment with specially designed sweep generating circuits adapted to compensate for the differences in engine speeds by providing a relatively constant amplitude sweep throughout the range of engine speed variations. It has generally been found, however, that such prior art sweep generating circuits are not wholly satisfactory for the reason that operation through a relatively wide range of speeds with a desired degree of linearity has been attained only with the use of relatively complex and expensive circuits having undue numbers of circuit components. Manifestly these prior art arrangements have not met the need for a relatively compact and inexpensive device adapted for use in serving aircraft and automotive internal combustion engines at both stationary and mobile locations. Prior art devices which have attempted to reduce complexity and cost generally have sacrificed either range of engine speed operability, or linearity of sweep, or both.

Accordingly, it is a general object of this invention to provide an improved sweep generator adapted to provide constant amplitude sweeps over a relatively wide range of sweep repetition frequencies.

More particularly, it is an object of this invention to provide an improved constant amplitude sweep generator adapted for use in investigating the operation and efficiency of the electrical circuits of an internal combustion engine.

It is another object of this invention to provide an improved constant amplitude sweep generator which is characterized by its accuracy of sweep length control over a wide range of sweep frequencies.

It is still another object of this invention to provide such an improved constant amplitude sweep generator having improved linearity characteristics at both high and low speeds of engine operation.

It is a further object of this invention to provide an improved constant amplitude sweep generator which is characterized by its compactness, low power requirements and economy of manufacture and operation.

These and other objects are realized in accordance with a specific embodiment of the invention which is adapted for use in the testing of the electrical circuits of an internal combustion engine or the like under operating conditions. It will be understood that although the invention will be described as utilized for the generation of a sawtooth voltage waveform to be used as the horizontal sweep in an engine analyzer, this description is for purposes of illustration only and is in no sense limiting since the constant amplitude sweep generator manifestly can serve a wide variety of other uses.

When used as an engine analyzer sweep circuit, the invention can be synchronized from an engine driven generator through a resistive phase resolver or alternatively from some device which provides a single pulse step function occurring at a chosen point in the engine cycle. In one embodiment of the invention the synchronizing voltage is amplified and shaped to form a square wave which is applied to a pair of separate circuit paths. In one circuit path, the square wave triggers a monostable multivibrator, the output of which is constant in amplitude and duration regardless of engine speed. This output is integrated and filtered to produce a D.C. voltage proportional to engine speed.

In the other circuit path, the square wave is applied to the suppressor grid of a sweep tube to cut off anode current flow but not screen current flow therein. The control grid of a control tube is directly connected to the anode of the sweep tube so that the rise of the control grid of the control tube during anode cut off in the sweep tube causes the control tube cathode, together with one terminal of a charging capacitor connected thereto, to be brought up in a similar manner. The other terminal of the charging capacitor is connected to the control grid of the sweep tube and through a charging resistor to the output of the integrating and filter network.

The initial rapid rise of the control grid and cathode of the control tube forms the vertical portion of the sawtooth sweep voltage. The linear slope of the sawtooth is formed by the operation of a feed back arrangement from the anode to the control grid of the sweep tube through the control tube control grid and cathode and the charging capacitor.

Thus, as the voltage rises on the control tube terminal of the charging capacitor, there is a voltage rise on the control grid of the sweep tube which results in an increase in plate current flow therethrough. This causes a decrease in sweep tube plate potential, a decrease in current flow in the control tube and a consequent decrease in potential on the control tube terminal of the charging capacitor. This action, which continues uninterrupted until the next synchronizing pulse, maintains a nearly constant potential difference across the charging resistor connected between the integrator and the control terminal of the charging capacitor. Therefore, the charging current remains nearly constant to produce a voltage slope having a high degree of linearity. The steepness of the voltage slope is dependent on the values of the charging capacitor, the charging resistors and the potential of the integrator voltage. The first two values do not change during the sweep. Consequently, since the integrator voltage is proportional to engine speed repetition rate, the sweep rate is automatically adjusted to maintain a constant sweep amplitude regardless of engine speed.

The above and other features of novelty which characterize the invention are pointed out with particularity in the claims annexed to and forming a part of this specification. For a better understanding of this invention, however, its advantages and specific objects attained with its use, reference is had to the accompanying drawing and descriptive material in which is shown and described several illustrative embodiments of the invention.

Figure 2:
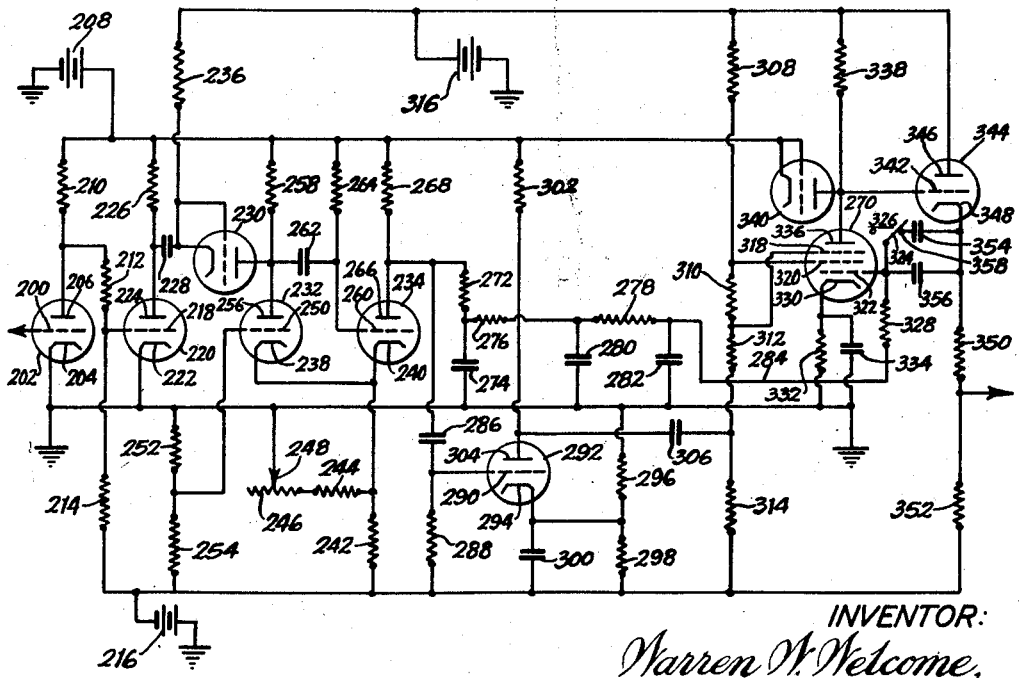

In the drawing:

Figure 1 is a schematic representation of a constant amplitude sweep generator embodying the invention; and Figure 2 is a schematic representation of an alternative form of constant amplitude sweep generator embodying the invention.

Referring now to the drawing and more particularly to Figure 1, there is shown one specific illustrative embodiment of the invention which may be utilized for the generation of a sawtooth voltage waveform in an engine analyzer. The synchronizing voltage is applied to the control grid 10 of amplifying and clipping tube 12. The cathode 14 of tube 12 is connected to ground and the anode 16 of tube 12 is connected through a current limiting resistor 18 to a source of positive potential 20. The output of tube 12 is applied from anode 16 through a coupling resistance 22 to control grid 24 of a second amplifying and shaping tube 26. The D.C. connection between anode 16 and control grid 24 is provided to eliminate possible phase shift at low frequencies and to eliminate the need for a relatively large and expensive coupling capacitor.

Control grid 24 of tube 26 is connected through a resistance 28 to a source of negative potential 30 and cathode 32 of tube 26 is connected to ground. Anode 34 of tube 26 is connected through current limiting resistance 36 to potential source 20. The amplified synchronizing voltage appearing at anode 34 in the form of a square wave is differentiated through capacitor 38 and the parallel combination of resistor 40, connected between capacitor 38 and potential source 20, and resistor 42, connected between capacitor 38 and ground.

The differentiated square wave is applied through cathode 44 and the anode 46 of rectifier 48 to a pair of circuit paths. One circuit path comprises multivibrator tubes 50 and 52 and integrator network 54, and the other circuit path comprises rectifier 56, sweep tube 58, and control tube 60. The purpose of differentiating the synchronizing voltage square wave and applying it through diode 48 is to assure that it will be out of the way before recovery of the multivibrator so that the duration of the timing waveform will remain constant at all engine speeds.

The multivibrator comprising tubes 50 and 52 is of the monostable type and is adapted to return to its original stable state a predetermined period of time after being triggered, the predetermined period of time being dependent upon the time constants of the circuit components.

Cathode 62 of tube 50 and cathode 64 of tube 52 are connected through a resistor 66. Cathode 64 also is connected through a resistor 68 to negative potential source 30 and through conductor 70 to suppressor grid 72 of tube 52. A voltage divider comprising series connected resistors 74, 76 and 78 is connected between negative potential source 30 and ground. Control grid 80 of tube 50 is connected to the junction of resistors 74 and 76 and screen grid 82 of tube 52 is connected to the junction of resistors 76 and 78. Anode 84 of tube 50 is connected through resistor 86 to ground and through coupling capacitor 88 to control grid 90 of tube 52. Control grid 90 also is connected through resistor 92 to ground.

The operation of the monostable multivibrator is well known and requires no further explanation here. It will be understood that when the multivibrator is triggered by the differentiated pulse applied from rectifier 48 there appears a relatively large square wave at anode 94 of tube 52 which is constant in amplitude and duration regardless of engine speed. Anode 94 is connected to ground through resistor 96 and to resistor 98 of integrator network 54. The square wave output of the multivibrator is integrated by resistor 98 and capacitor 100 and is filtered by resistor 102 and capacitor 104 to give a D.C. voltage on conductor 106 which is proportional to engine speed as indicated by the repetition rate of the synchronizing voltage pulses applied to tube 12.

Upon each triggering of the multivibrator, the negative going pulse at anode 84 of tube 50 is applied through conductor 108 to a differentiating network comprising capacitor 110 and the parallel combination of resistors 112 and 114 connected between ground and negative potential source 30. The differentiated output of this network is applied through cathode 116 and anode 118 of rectifier 56 to the suppressor grid 120 of tube 58. Resistors 112 and 114 form a voltage divider which establishes the proper level of voltage so that only the fast moving negative tip of the differentiated waveform is applied to suppressor grid 120.

A voltage divider comprising resistor 122, connected between ground and suppressor grid 120, and a resistor 124, connected between cathode 126 and suppressor grid 120 of the tube 58, is provided to establish the level of suppressor grid 120 before and after triggering of tube 58 at a value slightly positive with respect to cathode 126. Cathode 126 is connected across a voltage dividing network comprising series connected resistors 130, 132 and 134 connected between ground and negative potential source 30. Advantageously, resistor 132 comprises a potentiometer having a wiper arm 136 to which cathode 126 is connected so that the cathode may be adjusted to a level slightly positive to anode 94 of tube 52 during its conduction. The potential of anode 94 during conduction is the bottom of the integrated waveform and establishes a zero reference point from which the controlling voltage is built up in proportion to engine speed.

Screen grid 138 of tube 58 is connected to ground through resistor 140. Anode 142 of tube 58 is connected to positive potential source 20 through current limiting resistor 144 and to ground through rectifier 146. Anode 142 also is directly connected to control grid 148 of tube 60. Anode 150 of tube 60 is connected to positive potential source 20 through current limiting resistor 152.

Cathode 154 of tube 60 is connected to negative potential source 30 through resistor 156. Cathode 154 also is connected to a terminal of each of a pair of capacitors 158 and 160. The other terminals of capacitors 158 and 160 are connected to stationary contacts 162 and 164 respectively of switch 166. Movable contact arm 168 of switch 166 is connected directly to control grid 170 of tube 58 and to integrator network 54 through resistor 172 and conductor 106. Sweep output voltages may be taken from the circuit at conductor 174 connected to anode 150 of tube 60 and at conductor 176 connected to cathode 154 of tube 60.

In the operation of the circuit, the negative going pulse applied to suppressor grid 120 of tube 58 from rectifier 56 drives the suppressor far enough negative to cut off anode current flow but not screen current flow. Since control grid 148 of tube 60 is directly connected to anode 142 of tube 58, grid 148 rises in potential during anode cut off of tube 58 and consequently brings up cathode 154 in potential to suddenly apply a more positive potential to the terminals of capacitors 158 and 160 which are connected to cathode 154. This rapid rise in potential of control grid 148 and cathode 154 together with the sudden drop in potential of anode 150 forms the vertical portion of the sawtooth sweep voltage. The linear slope of the sawtooth sweep voltage is formed by the effect of this rapid rise on the circuit comprising tubes 58 and 60 and the feed back arrangement connected therebetween.

The negative going pulse which drove suppressor grid 120 of tube 58 to anode cut off is of very short duration and immediately after its removal the suppressor grid 120 returns to a potential slightly positive to cathode 126 and allows anode current to flow once again. Anode 142 drops in potential following the resumption of anode current flow taking with it control grid 148 and cathode 154 of tube 60 and, through charging capacitor 158, control grid 170 of tube 58. This action tends to limit the current flow which causes it and control grid 170 of tube 58 comes to rest at a potential slightly negative to cathode 126.

After the rapid rise of cathode 154, the potential on the cathode connected terminals of capacitors 158 and 160 is considerably more positive than the potential on the switch connected terminals of the capacitors. Thus in the switch position shown in Figure 1, there ensues current flow from integrator network 54 through conductor 106, charging resistor 172 and switch contacts 168, 162 and 164 to the switch connected terminals of capacitors 158 and 160. This current causes a rise in potential on control grid 170 with a consequent lowering of potential of anode 142 of tube 58, control grid 148 and cathode 154 of tube 60 in the manner described below. Thus, it will be appreciated that any increase in potential at the switch connected terminals of charging capacitors 158 and 160 results in a decrease in potential on the cathode connected terminals of charging capacitors 158 and 160. This action continues in a continuous flow of electrons into the switch connected terminals of charging capacitors 158 and 160 through charging resistor 172 to result in a continuous rise of potential of grid 170 through a relatively small potential and a continuous fall in potential of anode 142, control grid 148, cathode 154 and the cathode connected terminals of charging condensers 158 and 160 through a relatively large potential. If uninterrupted, this action would continue until the anode 142 of tube 58 bottoms against the knee of its characteristic curve, perhaps a few volts above the cathode potential. In accordance with this invention, however, anode 142 falls only through a relatively smaller amount as the action is interrupted by the next negative going pulse applied to the suppressor grid 120 of tube 58 to once again terminate anode current flow therein.

Due to the fact that the cathode connected terminals of the charging condensers 158 and 160 are becoming more negative during the time the switch connected terminal of the charging condenser is becoming more positive, it will be appreciated that the electron current flows through charging resistor 172 across a nearly constant potential difference. Therefore, the current remains nearly constant in amplitude and produces a rate of discharge of condenser 158, and consequently a sawtooth voltage slope, which is linear to within a very small degree of tolerance. For example, in a sawtooth sweep generator constructed in accordance with the above described invention the sawtooth waveform had a linearity of about 1% at low repetition frequencies and better than 1% at high repetition frequencies.

Further, it will be appreciated that the rate of discharge of capacitors 158 and 160 is dependent on the values of the capacitors, the charging resistance and the potential applied from integrator network 54. Since the capacitors and resistance values do not change during the sweep, the sweep rate will be inversely proportion to the integrator voltage. As described above the integrator voltage is proportional to the synchronizing voltage repetition rate (in this case, engine speed) and, since all relations are linear, the sweep rate is adjusted automatically to maintain constant sweep amplitude regardless of engine speed. In the circuit constructed in accordance with the above described invention there was no perceptible variation in the sweep length over an engine range of 1000 to 3000 r.p.m.

Switch 166 is provided to enable changing of the sweep speed within the range of engine operating speeds. Thus, contact arm 168 of switch 166 can be disconnected from contact 164 to obtain a fast or expanded sweep if desired. Charging capacitor 160 then is no longer connected in parallel with charging capacitor 158 and the charging rate will be fast enough to permit anode 142 to bottom against the knee of a characteristic curve in which case tube 58 simply waits for the next trigger pulse. It will be appreciated by those skilled in the art that if operation at other engine speed ranges is desired, the time constants of the multivibrator and the charging capacitors may be suitably adjusted, such as by means of additional switches provided therefor.

Rectifier 146 connected between anode 142 and ground is provided to insure that the sweep always starts from the same potential. Negative potential source 30 is provided so that the amplifier control grids will be near ground potential. Manifestly the output sawtooth sweep waveforms may be applied directly to the horizontal deflection plates of the cathode ray oscillograph or may be applied to a differential amplifier for push-pull deflection of the electron beam of the cathode ray oscillograph.

Referring now to the embodiment shown in Figure 2 of the drawing, the input synchronizing voltage is applied to control grid 200 of amplifier tube 202. Cathode 204 of tube 202 is connected to ground and anode 206 of tube 202 is connected to a source of positive potential 208 through current limiting resistor 210. The amplified signal is applied from anode 206 of tube 202 and through a voltage divider comprising resistors 212 and 214, connected between anode 206 and a source of negative potential 216, to control grid 218 of amplifier tube 220. Cathode 222 of tube 220 is connected to ground and anode 224 of tube 220 is connected to positive potential source 208 through current limiting resistor 226. The signal which appears at the anode of the tube 220 is approximately a square wave which is differentiated by capacitor 228 and resistor 236 and is applied as a negative going pip through rectifier 230 to the monostable multivibrator comprising tubes 232 and 234.

Cathodes 238 and 240 of multivibrator tubes 232 and 234, respectively, are connected to each other and to the junction of resistors 242 and 244 of a voltage divider comprising resistors 242, 244 and 246 connected between negative potential source 216 and ground. Advantageously, resistor 246 is a potentiometer having a wiper arm 248 which may be adjusted to return cathodes 238 and 240 to a point more negative than ground potential. This arrangement permits two triodes to be used in the monostable multivibrator in place of the triode and pentode utilized in the embodiment of Figure 1, as the desired low plate voltage during conduction is attained just as in the former embodiment.

Control grid 250 of tube 232 is connected to the junction of resistors 252 and 254 connected between ground and negative potential source 216. Anode 256 of tube 232 is connected to positive potential source 208 through resistor 258 and is coupled to control grid 260 of tube 234 by coupling capacitor 262. Control grid 260 also is connected to positive potential source 208 by resistor 264. Anode 266 is connected to positive potential source 208 through resistor 268.

In the operation of the monostable multivibrator, wiper arm 248 of potentiometer 246 is adjusted to bring anode 266 of tube 234 to a point slightly negative to ground during conduction. This permits the cathod of sweep tube 20 to operate at ground potential rather than at some positive potential, as in the first described embodiment, resulting in a larger controlling voltage and increased linearity.

The square pulse of constant duration and amplitude which appears at anode 266 of tube 234 for each cycle of the multivibrator is applied to two circuit paths. In one path the square pulse is integrated by resistor 272 and capacitor 274 and is filtered by resistors 276 and 278 and capacitors 280 and 282 to provide a D.C. controlling voltage proportional to engine speed on conductor 284.

In the other path the square pulse is differentiated by capacitor 286 and resistor 288 and is applied to control grid 290 of tube 292. Cathode 294 of tube 292 is connected to the junction of resistors 296 and 298 of a voltage dividing network connected between ground and negative potential source 216. A capacitor 300 is connected between cathode 294 and negative potential source 216 and a current limiting resistor 302 is connected between anode 304 and positive potential source 208. The cathode connected voltage divider biases tube 292 below cut off such that the tube conducts only when the positive going pips of the differentiated pulse is applied to its control grid 290. The time constant of capacitor 286 and resistor 288 is such that tube 292 conducts for a relatively short period sufficient only to allow the timing capacitor to be recharged to reinitiate the sweep.

The resultant large negative going pulse on anode 304 of tube 292 is coupled through capacitor 306 to a screen and suppressor grid voltage dividing network consisting of resistors 308, 310, 312 and 314 connected between positive potential source 316 and negative potential source 216. Suppressor grid 318 of sweep tube 270 is connected to the junction of resistors 310 and 312. Screen grid 320 is connected to the junction of resistors 308 and 310. Control grid 322 of sweep tube 270 is connected to movable switch blade 324 of switch 326, adapted for changing sweep speed within the range of engine operating speeds, and through resistor 328 to the integrator network output conductor 284.

Cathode 330 of sweep tube 270 is connected through the parallel combination of resistors 332 and capacitor 334 to ground. Anode 336 of tube 270 is connected to positive potential source 316 through current limiting resistor 338 and to positive potential source 208 through diode 340. Anode 336 also is connected to control grid 342 of tube 344. The anode 346 of tube 344 is connected to positive potential source 316 and cathode 348 is connected through resistors 350 and 352 to negative potential source 216. Advantageously the sawtooth sweep waveform may be taken from the junction of resistors 350 and 352.

The terminal of each of a pair of charging capacitors 354 and 356 is connected to cathode 348. The other terminal of capacitor 356 is connected to switch blade 324 of switch 326 and the other terminal of capacitor 354 is shown connected to stationary contact 358 of range switch 326. Thus, switch blade 324 of switch 326 may be operated to place capacitors 354 and 356 in parallel when a slow sweep is desired or to take capacitor 354 out of the circuit, leaving only capacitor 356, when the fast or extended sweep is desired.

The operation of the sweep portion of the circuit is similar to that described in connection with the embodiment of Figure 1. The negative going pulse applied to suppressor grid 318 of sweep tube 270 has the effect of lowering momentarily the potential to which the suppressor grid is returned through the voltage dividing network to induce the switching action. A reverse switch action is induced by the overshoot as the triggering pulse is removed. In this embodiment of the invention the trigger pulse is introduced by the voltage divider rather than directly on the suppressor grid in order to have some impedance between the suppressor grid and the trigger source to allow unrestricted action of the feed back from the anode of tube 270 for speeding up the switching action.

Sweep amplitude is dependent on the sweep rate, which in turn depends on the values of resistor 328, charging capacitor 354 and 356, and the potential of the integrator voltage on conductor 284. Thus, in this embodiment as in the embodiment of Figure 1, the sweep rate is automatically adusted in accordance with the synchronizing voltage repetition rate to maintain constant sweep amplitude regardless of engine speed.

It will be understood by those skilled in the art that modifications may be made in the construction and arrangement of the parts of the above described constant amplitude sweep generator without departing from the real purpose and spirit of the invention and that it is intended to cover by the appended claims any modified forms of structures, circuits or use of equivalents which reasonably may be included within their scope.

I claim:

1. A constant amplitude sweep generator comprising pulse shaping means for shaping and amplifying input pulses, said pulse shaping means including a monostable multivibrator adapted to produce an output pulse of constant amplitude and duration for each input pulse, an integrating network connected to said pulse shaping means for integrating the pulses to produce a direct current voltage proportional to the repetition rate of the input pulses and a sweep generating network connected to said pulse shaping means and to said integrating network for producing sweep voltages of constant amplitude over the range of input pulse repetition frequencies, said sweep generating network comprising a first discharge device including an anode, a cathode, a suppressor grid and a control grid, a second discharge device including an anode, a cathode and a control grid, capacitance means connected between said control grid of said first discharge device and the cathode of said second discharge device, means for applying the direct current voltage from said integrating network to said control grid of said first discharge device, means for applying pulses from said pulse shaping means to the suppressor grid of said first discharge device to terminate anode current flow therein, means connecting the anode of said first discharge device to the control grid of said second discharge device for causing the potential on said cathode of said second discharge device to be raised in response to the termination of anode current flow in said first discharge device, the increase in potential in said cathode resulting in current flow to said capacitance and means to raise the potential on the control grid of said first discharge device to increase anode current flow therein whereby the rate of current flow into said capacitance means is dependent upon the value of direct current voltage applied from said integrating network and hence dependent upon the repetition rate of the input pulses to the end that the output sweep voltage from said second discharge device is maintained at a constant amplitude over the range of repetition frequencies of the input pulses.

2. A constant amplitude sweep generator for use with the cathode ray oscilloscope of an engine analyzer comprising pulse shaping means including a multivibrator adapted to produce an output pulse of constant amplitude and duration for each input pulse, means for integrating the output pulses from said multivibrator to produce a voltage proportional to the repetition rate of the input pulses, a sweep generating network comprising a first discharge device, a second discharge device and capacitance means connected between said first and second discharge devices, means for applying pulses from said pulse shaping means to said first discharge device to terminate anode current flow therein, means connecting said first discharge device to said second discharge device for causing anode current flow in said second discharge device to be increased in response to the termination of anode current flow in said first discharge device, the increase in anode current flow in said second discharge device resulting in current flow to said capacitance and the resumption of anode current flow in said first discharge device, means applying the voltage from said integrating network to said capacitance means whereby the rate of current flow into said capacitance means is dependent upon the value of the integrating network voltage and therefore dependent upon the repetition rate of the input pulses to the end that the output sweep voltage from said second discharge device is maintained at a constant amplitude over the range of repetition frequencies of the input pulses.

3. A constant amplitude sweep generator for an engine analyzer comprising means for shaping and amplifying input pulses synchronized with engine speed, said means including a multivibrator adapted to produce an output pulse of constant amplitude and duration for each synchronized input pulse, an integrating network connected to said means for integrating the output pulses to produce a voltage proportional to engine speed and a sweep generating network connected to said means and to said integrating network for producing sweep voltages of constant amplitude over the range of engine speeds, said sweep generating network comprising a first discharge device including an anode, a cathode, and a control grid, a second discharge device including an anode, a cathode, and a control grid, capacitance means connected between the control grid of said first discharge device and the cathode of said second discharge device, conductor means connecting the anode of said first discharge device to the control grid of said second discharge device, and conductor means connecting the integrating network to the control grid of said first discharge device and to said capacitance means whereby the charging rate of said capacitance means is varied by the output of said integrating network to the end that the output sweep voltage from said second discharge device is maintained at a constant amplitude over the range of engine speeds.

4. A constant amplitude sweep generator comprising means including a monostable multivibrator for shaping input pulses to produce an output pulse of constant amplitude and duration for each input pulse, means connected to said multivibrator for integrating each output pulse to produce a control voltage proportional to the repetition frequency of said input pulses, means including a pair of discharge devices each having an anode, a cathode and at least one grid electrode, charging capacitance means connected between the control grid electrode of one discharge device and the cathode of the other discharge device for producing a linear sawtooth waveform for each output pulse applied thereto, means for connecting said multivibrator to one of said discharge devices, and means for applying said control voltage to said capacitance means to vary the slope of said linear sawtooth waveform in accordance with the value of said control voltage whereby the linear sawtooth waveforms are of constant amplitude over the range of repetition frequencies of said input pulses.

5. A constant amplitude sweep generator comprising first means for shaping input pulses to produce an output pulse of constant amplitude and duration for each input pulse, second means for integrating each output pulse to produce a control voltage proportional to the repetition frequency of said input pulses, third means connected to said first and second means for producing a linear sawtooth waveform for each output pulse applied thereto, said third means including charging capacitance means having a pair of terminals and charging resistance means connected to one of said pair of terminals, a first discharge device connected to one of said pair of terminals, a second discharge device connected to the other of said pair of terminals, and feedback means connecting said first and second discharge devices whereby a substantially constant potential difference is maintained across said charging resistance means during the time the slope of the sawtooth waveform is being formed to enable substantially constant current flow into said capacitance means to provide a sawtooth waveform of linear slope, and conductor means for applying said control voltage to said charging capacitance means to vary the slope of said linear sawtooth waveform in accordance with the amplitude of said control voltage whereby the linear sawtooth waveforms are of constant amplitude over the range of repetition frequencies of said input pulses.

6. A constant amplitude sweep generator for an engine analyzer comprising pulse shaping means for shaping input pulses of repetition frequency determined by engine speed to produce output pulses of the same repetition frequency having a constant amplitude and duration, integrator means for integrating each output pulse to produce a control voltage proportional to the repetition frequency of said input pulses, sweep generating means connected to said pulse shaping means and said integrator means for producing a linear waveform for each output pulse applied thereto, said sweep generating means including charging capacitor means having a pair of terminals, a first discharge device connected to one of said pair of terminals, a second discharge device connected to the other of said pair of terminals, and conductor means connecting said first and second discharge devices, and conductor means connected between said integrator means and said charging capacitor means for applying said control voltage to said charging capacitor means to vary the slope of said linear sawtooth waveform in accordance with the amplitude of said control voltage whereby the linear sawtooth wavforms are of constant amplitude over the range of repetition frequencies of said input pulses.

7. A sweep generator for an engine analyzer adapted to provide sawtooth sweep voltages of constant amplitude in synchronism with input pulses of repetition rate determined by engine speed comprising pulse shaping means for shaping and amplifying input synchronizing pulses, diode means for rectifying the shaped pulses, a monostable multivibrator connected to said diode means adapted to produce an output pulse of constant amplitude and duration for each input synchronizing pulse, an integrating network connected to said multivibrator for integrating the output pulses to produce a voltage proportional to the repetition rate of the input synchronizing pulses, and a sweep generating network connected to said diode means, and to said integrating network for producing sweep voltages of constant amplitude over the operating range of synchronizing pulse repetition frequencies, wherein said sweep generating network comprises a first discharge device including an anode, a cathode, a suppressor grid and a control grid, a second discharge device including an anode, a cathode and a control grid, capacitance means connected between said control grid of said first discharge device and said cathode of said second discharge device, means connecting the anode of said first discharge device and said control grid of said second discharge device, means for applying said voltage from said integrating network to said control grid of said first discharge device and means for applying pulses from said pulse shaping means to the suppressor grid of said first discharge device.

8. A sweep generator in accordance with claim 7 wherein said capacitance means comprises a plurality of capacitors and switch means for connecting selected combinations of said capacitors between the cathode of said second discharge device and the control grid of said first discharge device.

9. A sweep generator in accordance with claim 7 wherein said sweep generating network further comprises switch means for enabling the value of said capacitance means connected between said first and second discharge devices to be selectively varied to vary the slope of said sweep voltages.

References Cited in the file of this patent

UNITED STATES PATENTS

| | | |
|---|---|---|
| 2,266,516 | Russell | Dec. 16, 1941 |
| 2,645,715 | Weller et al. | July 14, 1953 |